(12) United States Patent
Jang et al.

(10) Patent No.: US 10,800,282 B2
(45) Date of Patent: Oct. 13, 2020

(54) VEHICLE RESERVATION-BASED CHARGING DEVICE AND METHOD OF CONTROLLING THE SAME

(71) Applicants: Hyundai Motor Company, Seoul (KR); Kia Motors Corporation, Seoul (KR)

(72) Inventors: Young Jin Jang, Whasung-si (KR); Hyung Souk Kang, Whasung-si (KR); Soung Han Noh, Whasung-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 76 days.

(21) Appl. No.: 16/179,055

(22) Filed: Nov. 2, 2018

(65) Prior Publication Data
US 2019/0351775 A1     Nov. 21, 2019

(30) Foreign Application Priority Data

May 15, 2018     (KR) .......................... 10-2018-0055677

(51) Int. Cl.
 *H02J 7/00*       (2006.01)
 *B60L 53/66*      (2019.01)
 *G06Q 30/02*      (2012.01)
 *G06Q 50/06*      (2012.01)

(52) U.S. Cl.
 CPC ........ *B60L 53/665* (2019.02); *G06Q 30/0283* (2013.01); *G06Q 50/06* (2013.01); *B60L 2230/16* (2013.01); *B60Y 2200/91* (2013.01); *B60Y 2300/91* (2013.01)

(58) Field of Classification Search
 USPC ......................................................... 320/109
 See application file for complete search history.

(56) References Cited

U.S. PATENT DOCUMENTS

| | | | | |
|---|---|---|---|---|
| 2006/0284595 A1* | 12/2006 | Hsieh | ................... | H02J 7/0077 320/115 |
| 2011/0169452 A1* | 7/2011 | Cooper | ................ | G01R 31/396 320/116 |
| 2013/0141034 A1* | 6/2013 | Huang | .................... | H02J 7/045 320/107 |
| 2014/0028252 A1* | 1/2014 | Vuori | ...................... | H02J 50/40 320/108 |

(Continued)

FOREIGN PATENT DOCUMENTS

KR     10-2016-0036117 A     4/2016

OTHER PUBLICATIONS

KR20160036117 machine Translation (Year: 2016).*

*Primary Examiner* — Samuel Berhanu
(74) *Attorney, Agent, or Firm* — Morgan, Lewis & Bockius LLP (57) ABSTRACT

A method of controlling a vehicle reservation-based charging device, may include determining a reason for waking up a charge controller for controlling an in-vehicle charger for charging a first battery used as a power source of a vehicle when the charge controller is woken up in a reservation-based charging mode of the in-vehicle charger; and turning off the charge controller upon determining that the charge controller is woken up due to an abnormal operation of an outside-vehicle charger.

20 Claims, 3 Drawing Sheets

(56) References Cited

U.S. PATENT DOCUMENTS

| | | | |
|---|---|---|---|
| 2014/0049224 A1* | 2/2014 | Hua | H02J 7/0068 320/136 |
| 2014/0361746 A1* | 12/2014 | Saito | H02J 7/0031 320/118 |
| 2015/0097526 A1* | 4/2015 | DeDona | B60L 3/00 320/109 |
| 2015/0165924 A1* | 6/2015 | Cho | B60L 11/1838 320/157 |
| 2016/0028262 A1* | 1/2016 | Lee | H01R 13/447 320/155 |
| 2016/0164343 A1* | 6/2016 | Hara | H02J 50/80 307/104 |
| 2016/0264011 A1* | 9/2016 | Yasukawa | H04M 15/68 |
| 2019/0077273 A1* | 3/2019 | Jang | H02J 7/0071 |

* cited by examiner

VEHICLE RESERVATION-BASED CHARGING DEVICE AND METHOD OF CONTROLLING THE SAME

CROSS-REFERENCE TO RELATED APPLICATION

The present application claims priority to Korean Patent Application No. 10-2018-0055677 filed on May 15, 2018, the entire contents of which is incorporated herein for all purposes by this reference.

BACKGROUND OF THE INVENTION

Field of the Invention

The present invention relates to a vehicle reservation-based charging device and a method of controlling the same, and more particularly, to a vehicle reservation-based charging device and a method of controlling the same, for preventing malfunction of a reservation-based charging device due to an abnormal operation of an outside-vehicle charger.

Description of Related Art

A vehicle that utilizes electrical energy as a power source, for example, an electric vehicle or a hybrid vehicle is designed to perform reservation-based charging and, in the instant case, the reservation-based charging refers to a procedure in which a vehicle battery begins to be charged at a time point desired by a user and charging of the vehicle battery is terminated when a predetermined state of charge (SoC) is reached.

When the reservation-based charging is set, even if a charging connector installed in an outside-vehicle charger (power supply device) such as electric vehicle supply equipment (EVSE), is connected to the vehicle, charging begins when a reservation-based charging time is reached rather than being immediately started. In the instant case, a charger installed in the vehicle is maintained in a state in which reservation-based charging is available and the vehicle enters a sleep mode by turning off a controller for control of the charger up to a time when charging begins.

As such, when a reservation-based charging time is reached, all controllers related to charging in a vehicle control unit (VCU) are woken up to begin battery charging.

Accordingly, when a driver wants immediate charging in a state in which reservation-based charging is set, the driver needs to cancel the reservation-based charging. To cancel reservation-based charging, a controller needs to be turned on and, thus, a vehicle needs to be turned on (IG ON) to cancel reservation-based charging.

To overcome this inconvenience, there has been a proposal for a method of canceling reservation-based charging using only a button for cancelling reservation-based charging without vehicle starting (IG ON).

However, when reservation-based charging is canceled using the button for canceling reservation-based charging, all in-vehicle controllers related to charging are woken up and, thus, all controllers related to charging are disadvantageously always turned on whenever a driver pushes the button for canceling reservation-based charging. In detail, when the button for canceling reservation-based charging is operated, all controllers related to charging are turned on to cancel reservation-based charging and to enter normal charging. Accordingly, even in a condition in which charging is not possible (e.g., a charging connector is not connected or a charging fee is not paid), all controllers are always turned on.

When the button for canceling reservation-based charging is repeatedly turned on, controllers related to charging are continuously turned on/off and, accordingly, there is a problem in that an on/off sequence of the controllers related to charging is affected.

To overcome the above problem, included is a technology for turning on only one controller (i.e., charge controller) which is in charge of charging among all controllers related to charging, determining whether charging is available and, then, turning on all of the controllers related to charging when a current state is a rechargeable state rather than turning on all of the controllers related to charging when a user operates a button for canceling reservation-based charging.

However, when the charge controller among all of the controllers related to vehicle charging is turned on, because there are various conditions for turning on the charge controller as well as the operation of the button for canceling reservation-based charging, it may be impossible to accurately determine whether the charge controller is turned on due to the operation of the button for canceling reservation-based charging and, when the charge controller is woken up without user intention, if the reason for waking up the charge controller is misrecognized as user intention and other conditions for determining whether charging is available as well as the wake up condition of the charge controller are satisfied, there is a problem in that a reservation-based charging error occurs, for example, all controllers related to charging are turned on.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle reservation-based charging device and a method of controlling the same, for concretely and discriminately determining the reason for waking up a charge controller which is in charge of control of vehicle battery charging when the charge controller is woken up and for appropriately performing an associated operation based on the determined reason for waking up the charge controller, preventing malfunction of a reservation-based charging device due to unintentional wake up of the charge controller.

In an exemplary embodiment of the present invention, a method of controlling a vehicle reservation-based charging device may include determining a reason for waking up a charge controller for controlling an in-vehicle charger for charging a first battery used as a power source of a vehicle when the charge controller is woken up in a reservation-based charging mode of the in-vehicle charger, and turning off the charge controller upon determining that the charge controller is woken up due to an abnormal operation of an outside-vehicle charger.

In detail, the turning off the charge controller may include determining whether the outside-vehicle charger abnormally operates based on a charger abnormality flag signal stored in the charge controller when a battery relay for controlling power supply of a second battery to the charge controller is turned off and a reservation-based charging cancellation signal for canceling reservation-based charging of the in-vehicle charger is not generated, and determining that the charge controller is woken up due to an abnormal operation of the outside-vehicle charger upon determining that the outside-vehicle charger abnormally operates.

The second battery may be connected to the charge controller through the battery relay to supply power to the charge controller when the battery relay is turned on, and the battery relay may be turned on by other controller which is woken up.

The second battery may be connected to the charge controller through a reservation-based charging cancellation signal generator for generating the reservation-based charging cancellation signal to supply power to the charge controller when a reservation-based charging cancellation signal is generated, and a controller power supply device for supplying power of the second battery to the charge controller to wake up the charge controller when the reservation-based charging cancellation signal is generated may be installed between the reservation-based charging cancellation signal generator and the charge controller.

The turning off the charge controller may include, when whether the outside-vehicle charger abnormally operates based on the charger abnormality flag signal, upon determining that the outside-vehicle charger does not normally operate, it may be determined that the outside-vehicle charger does not normally operate, determining that the charge controller is woken up because a charging fee payment signal for use of the outside-vehicle charger is generated by a charger payment determination device. The second battery may be connected to the charge controller through the charger payment determination unit to supply power to the charge controller when the charger payment determination unit generates the charging fee payment signal. Furthermore, upon determining that the charging fee payment signal is generated and receiving a charging start signal by the charge controller, the first battery may begin to be charged.

Upon determining that the charging fee payment signal is generated, when the outside-vehicle charger does not receive a charging start signal, the charge controller may be turned off, and when a reservation-based charging mode of the in-vehicle charger is set, a charger abnormality flag signal for detecting an abnormal operation of the outside-vehicle charger may be stored in a non-volatile storage of the charge controller prior to the turning off of the charge controller.

Here, the in-vehicle charger may receive power from the outside-vehicle charger to charge the first battery. In other words, the outside-vehicle charger may supply power for charging the first battery to the in-vehicle charger.

In another exemplary embodiment of the present invention, a vehicle reservation-based charging device may include an in-vehicle charger configured to charge a first battery used as a power source of a vehicle, a controller power supply device configured to supply power to a charger controller for controlling the in-vehicle charger to wake up the charge controller when power is supplied from a second battery of the vehicle, a power supply control unit installed between the second battery and the controller power supply device and configured to control electrical connection between the second battery and the controller power supply device, and a charge controller configured to be turned off upon being woken up due to an abnormal operation of an outside-vehicle charger when the in-vehicle charger is in a reservation-based charging mode.

Here, the power supply control unit may include a reservation-based charging cancellation signal generator configured to generate a reservation-based charging cancellation signal for canceling reservation-based charging of the in-vehicle charger during an operation and to supply power of the second battery to the controller power supply device, and a battery relay installed between the second battery and the controller power supply device and configured to supply power of the second battery to the controller power supply device during an operation.

When the second battery and the controller power supply device are not electrically connected by the power supply control unit, the charge controller may determine whether the outside-vehicle charger abnormally operates based on a charger abnormality flag signal stored in the charge controller and, upon determining that the outside-vehicle charger abnormally operates, the charge controller may determine that the charge controller is woken up due to an abnormal operation of the outside-vehicle charger.

Upon determining that the outside-vehicle charger does not abnormally operate, the charge controller may determine that the charge controller is woken up because a charging fee payment signal for use of the outside-vehicle charger is generated by a charger payment determination device.

The charge controller may be turned off when the charger payment determination unit generates a charging fee payment signal and the outside-vehicle charger does not receive a charging start signal and may store a charger abnormality flag signal for detecting an abnormal operation of the outside-vehicle charger in a non-volatile storage of the charge controller before the charging controller is turned off when a reservation-based charging mode of the in-vehicle charger is set.

The vehicle reservation-based charging device may further include a reservation-based charging cancellation signal maintaining unit installed between the reservation-based charging cancellation signal generator and the charge controller and configured to maintain the reservation-based charging cancellation signal generated by the reservation-based charging cancellation signal generator for a predetermined time and to transmit the reservation-based charging cancellation signal to the charge controller.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Hereinafter reference will now be made in detail to various embodiments of the present invention, examples of which are illustrated in the accompanying drawings and described below.

Figure 1:
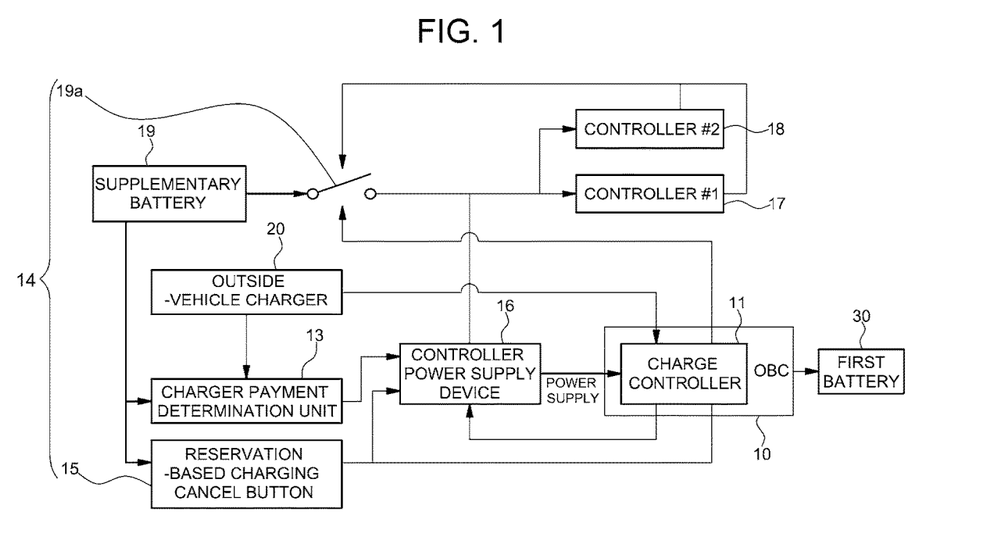
FIG. 1 is a diagram showing a configuration of a vehicle reservation-based charging device according to an exemplary embodiment of the present invention.

FIG. 1 is a diagram showing a configuration of a vehicle reservation-based charging device using electrical energy as a power source.

As illustrated in FIG. 1, to supply wake-up power to a charge controller 11 for control of an in-vehicle charger 10, the vehicle reservation-based charging device according to an exemplary embodiment of the present invention may include a charger payment determination unit 13 for recognizing charging fee payment for use of an outside-vehicle charger 20, a reservation-based charging cancel button 15 for canceling reservation-based charging of the in-vehicle charger 10 in a reservation-based charging mode (reservation-based charging standby) according to a manual operation (user manipulation), and in-vehicle controllers 17 and 18 (hereinafter, 'other controllers') related to in-vehicle charging for turning on a battery relay 19a.

The charge controller 11 may be in charge of charge control of a first battery 30 (hereinafter referred to as a 'main battery') used as a vehicle power source and may be installed in the in-vehicle charger 10 for receiving power from the outside-vehicle charger 20 to recharge the main battery, and the in-vehicle charger 10 may be a charger installed in a vehicle and may also be referred to as an on board charger (OBC). In other words, the charge controller 11 may control an operation of the in-vehicle charger 10 to control charging of the main battery.

The outside-vehicle charger 20 may be a power supply device outside a vehicle, for supplying power to recharge the main battery, and may refer to a power supply device such as a home electrical outlet or electric vehicle supply equipment (EVSE).

The other controllers 17 and 18 may be a battery management system (BMS), a hybrid control unit (HCU), or the like as an in-vehicle controller related to charging of the main battery except for the charge controller 11, may selectively turn on the battery relay 19a for controlling power supply of a supplementary battery 19 (also referred to as a 'second battery') in a state in which the other controllers 17 and 18 are turned on by receiving power from an in-vehicle power supply for supplying power to the other controllers 17 and 18 or, depending on the cases, may be turned on by receiving power of the supplementary battery 19 through the battery relay 19a.

For reference, although FIG. 1 illustrates the other controllers 17 and 18 as the two controllers 17 and 18, the number, function, and the like of the other controllers 17 and 18 related to charging of the main battery are not limited thereto. For example, the other controllers 17 and 18 may each be a vehicle control unit (VCU) for waking up the charge controller 11 when a reservation-based charging time is reached, a controller TMS for waking up the charge controller 11 according to a remote charging signal, and a controller CGW for waking up the charge controller 11 when a vehicle door is open.

The reservation-based charging cancel button 15 may be a reservation-based charging cancellation signal generator for generating a reservation-based charging cancellation signal (e.g., trigger signal), may be electrically connected between the supplementary battery 19 and a controller power supply device 16 to receive power of the supplementary battery 19 during an operation of the reservation-based charging cancel button 15 and to supply the power to the controller power supply device 16, and may be connected to the charge controller 11 that receives wake-up power by the controller power supply device 16.

When the reservation-based charging cancel button 15 is turned on, in other words, when the reservation-based charging cancel button 15 is operated to generate the reservation-based charging cancellation signal for canceling reservation-based charging of the in-vehicle charger 10, active power for activating the controller power supply device 16 may be maintained for a predetermined time by the reservation-based charging cancel button 15 and may be supplied to the controller power supply device 16 through the reservation-based charging cancel button 15.

Upon receiving power of the supplementary battery 19, the controller power supply device 16 may be connected between a power supply control unit 14 and the charge controller 11 to supply wake-up power to the charge controller 11, may be activated and woken up by active power and, then, may supply power to the charge controller 11 to wake up the charge controller 11.

The power supply control unit 14 may be installed between the supplementary battery 19 and the controller power supply device 16 to control electrical connection between the supplementary battery 19 and the controller power supply device 16 and may include the reservation-based charging cancel button 15 for controlling transmission of power of the supplementary battery 19 to the controller power supply device 16, and the battery relay 19a. As illustrated in FIG. 1, the reservation-based charging cancel button 15 and the battery relay 19a may be connected in parallel to each other between the supplementary battery 19 and the controller power supply device 16.

When the in-vehicle charger 10 is in a reservation-based charging mode, the charge controller 11 may determine whether reservation-based charging is canceled based on whether a charging fee payment signal of the charger payment determination unit 13 and an operation signal (i.e., a reservation-based charging cancelling signal) of the reservation-based charging cancel button 15 are received.

Figure 2:
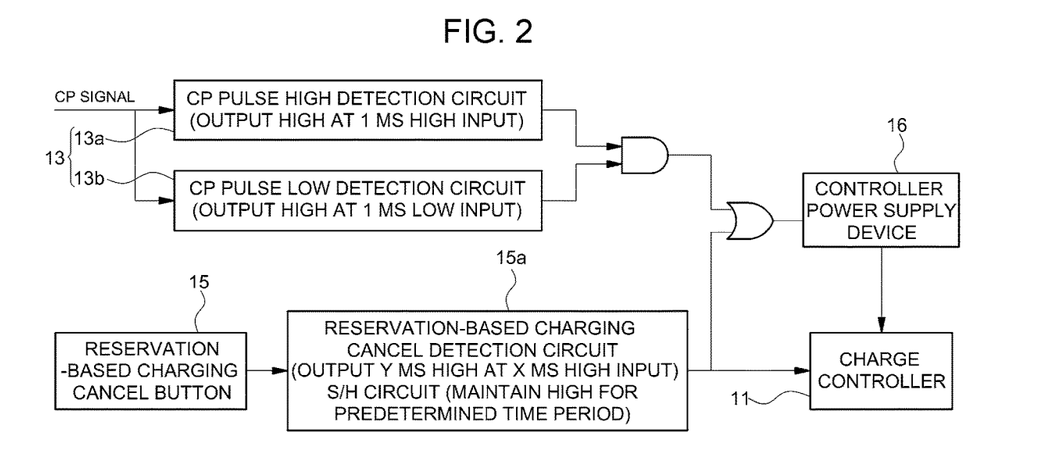
FIG. 2 is a diagram illustrating a circuit configuration of a charge controller, a charger payment determination unit, and a reservation-based charging cancel button of a vehicle reservation-based charging device according to an exemplary embodiment of the present invention, in more detail.
Figure 3:
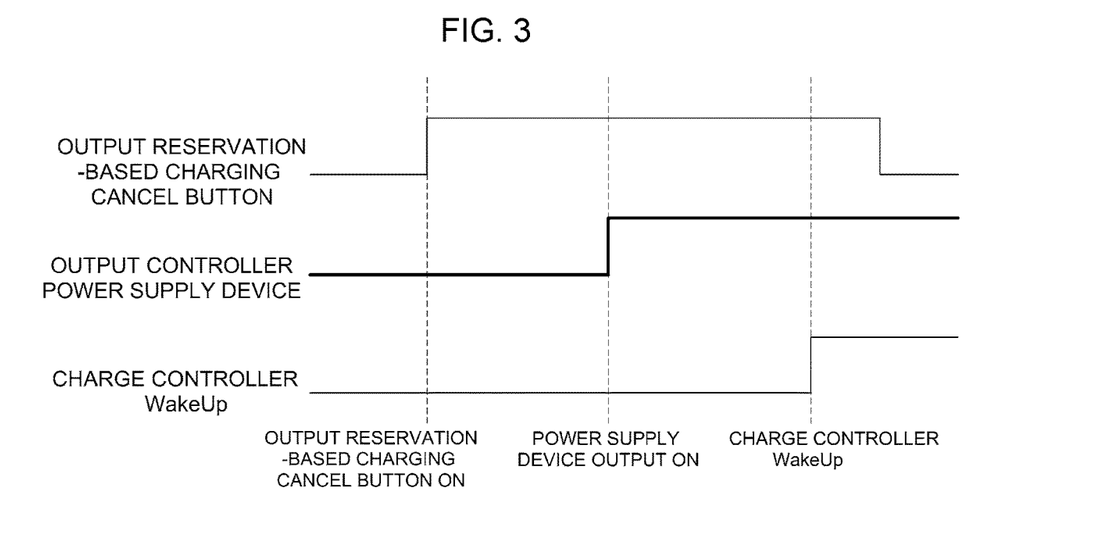
FIG. 3 is a diagram showing the case in which a high signal of a reservation-based charging cancel button is maintained until a charge controller is woken up during an operation of a reservation-based charging cancel button.

FIG. 2 is a diagram illustrating a circuit configuration of the charge controller 11, the charger payment determination unit 13, and the reservation-based charging cancel button 15 in more detail. FIG. 3 is a diagram showing the case in which a high signal of the reservation-based charging cancel button 15 is maintained until the charge controller 11 is woken up during an operation of the reservation-based charging cancel button 15.

As illustrated in FIG. 2, a reservation-based charging cancellation signal maintaining unit 15a may be connected to an output terminal of the reservation-based charging cancel button 15 and may prolong an operation signal of the reservation-based charging cancel button 15 for a predetermined time during an operation of the reservation-based charging cancel button 15 to maintain the active power transmitted to the controller power supply device 16 for a predetermined time period.

The reservation-based charging cancellation signal maintaining unit 15a may be configured to maintain a high signal (reservation-based charging canceling signal) according to an operation of turning on the reservation-based charging cancel button and, thus, the charge controller 11 may be woken up by the controller power supply device 16 and, then, may receive the reservation-based charging canceling signal of the reservation-based charging cancel button 15 (refer to FIG. 3).

As illustrated in FIG. 2, the charger payment determination unit 13 may be configured to determine whether a charging fee is paid by a user, based on a control pilot (CP) signal received from the outside-vehicle charger 20.

In detail, the charger payment determination unit 13 may include a high signal detection unit 13a for detecting a high signal of the CP signal and a low signal detection unit 13b for detecting a low signal and, upon determining that the CP signal input from the outside-vehicle charger 20 is a square wave based on the detection results of the high signal detection unit 13a and the low signal detection unit 13b, active power may be supplied to the controller power supply device 16 for a predetermined time using power of the supplementary battery 19.

The controller power supply device 16 may be activated and woken up by active power and, then, may supply power to the charge controller 11 to wake up the charge controller 11.

In detail, the controller power supply device 16 may be activated to wake up the charge controller 11 as long as at least any one of the charger payment determination unit 13 and the reservation-based charging cancel button 15 supplies the active power to the controller power supply device 16.

As described above with reference to FIG. 1, when the in-vehicle charger 10 is in a reservation-based charging mode, if the vehicle reservation-based charging device recognizes a charging fee payment signal generated by the charger payment determination unit 13 based on the CP signal of the outside-vehicle charger 20 or recognizes an operation of turning on the reservation-based charging cancel button 15, or the other controllers 17 and 18 turn on the battery relay 19a, a controller (i.e., charge controller 11) of the in-vehicle charger 10 may receive power of the supplementary battery 19 and may be woken up.

Accordingly, when the charge controller 11 is turned on in the reservation-based charging mode, it may be required to determine the reason for waking up the charge controller 11 and to control an operation of the vehicle reservation-based charging device based on the determined reason for waking up the charge controller 11.

When the charge controller 11 is woken up without user intention, for example, when an error occurs in the charger payment determination unit 13 due to an abnormal operation of the outside-vehicle charger 20 and a signal (charging fee payment signal) of the charger payment determination unit 13 is generated, is canceled halfway and, then, is generated again (refer to FIG. 4), although a new charging fee payment signal is not generated, the signal may be recognized as a newly generated signal and a problem may arise in terms of an operation of the charge controller 11 and, thus, the reservation-based charging device may malfunction.

Figure 4:
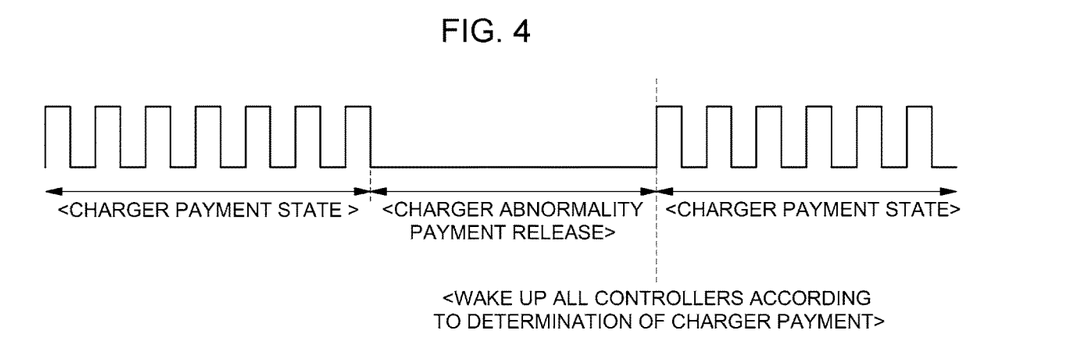
FIG. 4 is a diagram showing an abnormality signal of a charger payment determination unit due to an abnormal operation of an outside-vehicle charger according to an exemplary embodiment of the present invention.

Referring to FIG. 4 in more detail, in the reservation-based charging mode of the in-vehicle charger 10, when the CP signal for determining whether a charging fee for charger use is paid is temporarily off halfway and is on again due to malfunction of the outside-vehicle charger 20 while the charger payment determination unit 13 receives the CP signal from the outside-vehicle charger 20, the charger payment determination unit 13 may determine that a new charging fee payment signal is generated and, thus, an error may arise in an operation of the charge controller 11 and the other controllers 17 and 18. For example, when the charger payment determination unit 13 re-generates a charging fee payment signal due to an abnormal operation of the outside-vehicle charger 20, there may be a problem in which the charge controller 11 and the other controllers 17 and 18, which are in a wake-up state, are woken up again, causing power loss, and the like.

Accordingly, according to an exemplary embodiment of the present invention, in the reservation-based charging mode of the in-vehicle charger 10, when the charge controller 11 is woken up, the reason for waking up the charge controller 11 may be discriminately determined and an associated operation may be appropriately performed based on the determined reason for waking up the charge controller 11 and, thus, a problem in terms of malfunction of the reservation-based charging when the charge controller 11 is unintentionally woken up may be prevented.

Figure 5:
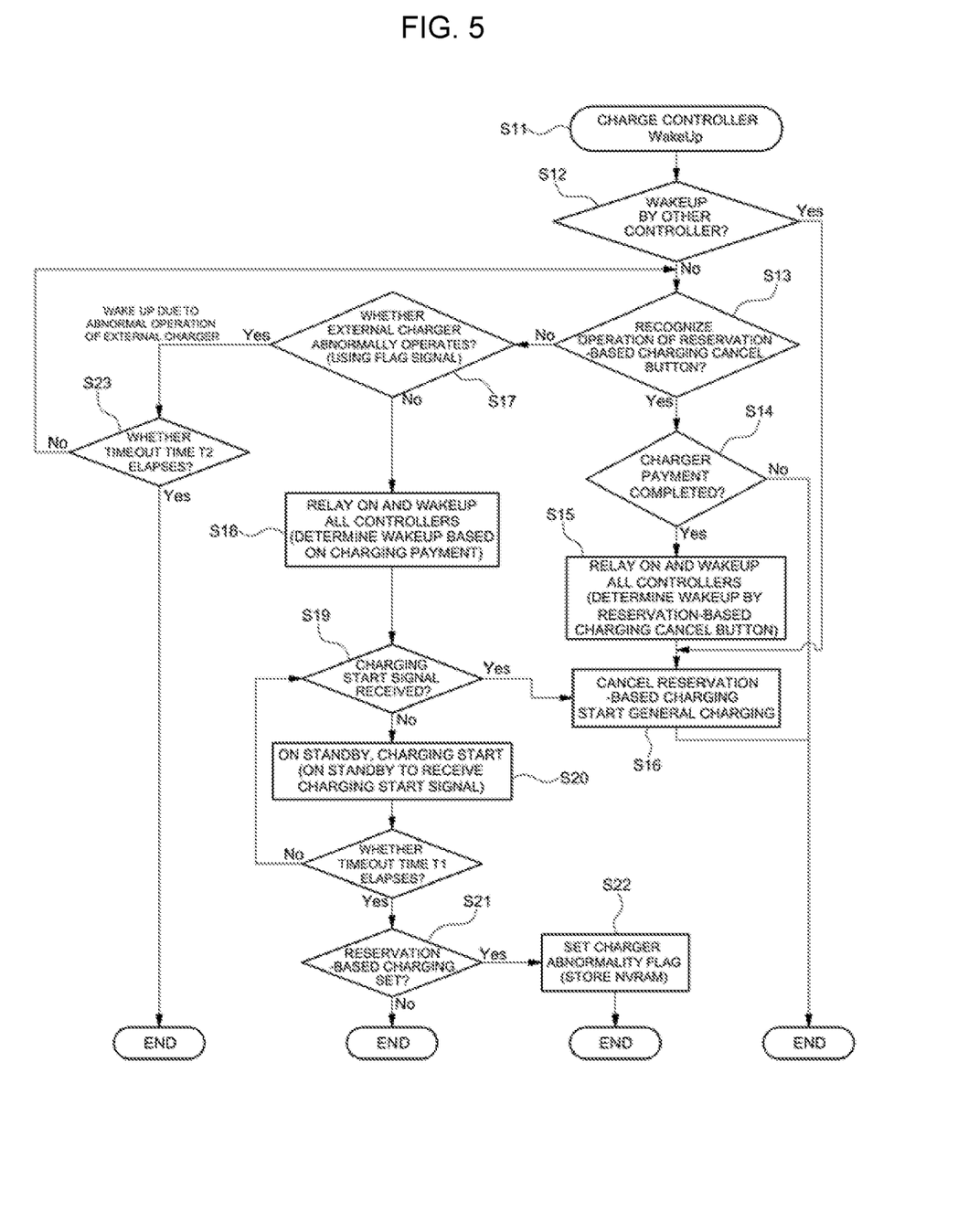
FIG. 5 is a flowchart of a method of controlling a vehicle reservation-based charging device.

FIG. 5 is a flowchart of a method of controlling a vehicle reservation-based charging device according to an exemplary embodiment of the present invention.

As illustrated in FIG. 5, when the charge controller 11 is woken up in a reservation-based charging mode of the in-vehicle charger 10 (S11), the reason for waking up the charge controller 11 may be determined.

To determine the reason for waking up the charge controller 11, first, whether the battery relay 19a is turned on by the other controllers 17 and 18 may be determined (S12).

When the battery relay 19a is turned on by the other controllers 17 and 18, power of the supplementary battery 19 activates the controller power supply device 16 by the battery relay 19a and, thus, when all other conditions (e.g., generation of a charging fee payment signal) for starting general charging are satisfied, the charge controller 11 may cancel reservation-based charging of a main battery and execute normal charging of the main battery.

Here, the normal charging refers to a procedure in which the main battery immediately begins to be recharged when a charging connector installed in the outside-vehicle charger 20 is connected to a vehicle.

In operation S12, upon determining that the battery relay 19a is not turned on by the other controllers 17 and 18, whether the reservation-based charging cancel button 15 is turned on may be determined (S13).

When the reservation-based charging cancel button 15 is turned on, whether a charging fee for use of the outside-vehicle charger 20 is completely paid may be determined based on the charging fee payment signal (S14).

Upon determining that a user completely pays the charging fee based on whether the charging fee payment signal is generated, in other words, upon determining that the charger payment determination unit 13 generates the charging fee payment signal, the charge controller 11 may turn on the battery relay 19a and, thus, all in-vehicle controllers related to charging of the main battery, which include the other controllers 17 and 18, may be woken up (S15).

As such, the charge controller 11 may release the reservation-based charging mode of the in-vehicle charger 10 and may begin normal charging based on the signal of the reservation-based charging cancel button 15 (S16).

As such, when normal charging of the main battery is completed, the charge controller 11 may be on standby to receive a charge enable signal for a predetermined time and, then, may be turned off again in a sleep mode.

In operation S14, upon determining that a charging fee is not completely paid based on whether the charging fee payment signal is generated, the charge controller 11 may be immediately turned off in a sleep mode rather than turning on the battery relay 19a.

In operation S13, when the reservation-based charging cancel button 15 is not turned on, that is, when an operation of the reservation-based charging cancel button 15 is not recognized, in other words, when the reservation-based charging cancel button 15 is not operated (turned off), the reason for waking up the charge controller 11, determined in operation S11, may be determined as an abnormal operation of the outside-vehicle charger 20 or a charging fee payment signal of the charger payment determination unit 13.

In other words, when the supplementary battery 19 and the controller power supply device 16 are not electrically connected by a power supply control unit, that is, when the battery relay 19a is not turned on and the reservation-based charging cancel button 15 is not turned on by the other controllers 17 and 18, the reason for waking up the charge controller 11, determined in operation S11, may be determined as an abnormal operation of the outside-vehicle charger 20 or generation of a charging fee payment signal.

Accordingly, the charge controller 11 may determine whether the outside-vehicle charger 20 abnormally operates using a charger abnormality flag signal stored in a non-volatile storage (e.g., NVRAM) of the charge controller 11 (S17). Here, the non-volatile storage is a memory region in which data is not deleted even if the charge controller 11 is powered off.

The charger abnormality flag signal may be a setting value stored in the non-volatile storage of the charge controller 11 to determine whether the in-vehicle charger 10 is on standby in a reservation-based charging mode or the outside-vehicle charger 20 abnormally operates and the charge controller 11 may determine whether the outside-vehicle charger 20 abnormally operates based on a value of the charger abnormality flag signal when the outside-vehicle charger 20 abnormally operates.

In other words, the charge controller 11 may determine an abnormal operation state of the outside-vehicle charger 20 using the charger abnormality flag signal when the outside-vehicle charger 20 abnormally operates (e.g., when a charging fee payment signal of the outside-vehicle charger 20, which itself wakes up the charge controller 11, is generated again in a wake-up state of the charge controller 11, i.e., when the charging fee payment signal is repeatedly generated).

Upon determining that the outside-vehicle charger 20 does not abnormally operate, the charge controller 11 may determine that the charge controller 11 is woken up according to generation of the charging fee payment signal and may turn on the battery relay 19a to wake up all in-vehicle controllers related to charging of a main battery as well as the other controllers 17 and 18 (S18).

As such, the charge controller 11 may determine whether a charging start signal transmitted from the outside-vehicle charger 20 is received by the charge controller 11 (S19).

Upon receiving a charging start signal indicating that charging is capable of being started from the outside-vehicle charger 20, the charge controller 11 may cancel reservation-based charging and may perform a normal charging operation for charging a main battery using power of the outside-vehicle charger 20 (S16).

When the charge controller 11 does not receive the charging start signal, the charge controller 11 may be on standby to receive the charging start signal for a standby time T1 which is set to a predetermined time value (S20) and may be autonomously turned off when the charge controller 11 does not receive the charging start signal even during the standby time T1.

In the instant case, when the charge controller 11 does not receive the charging start signal even during the standby time T1, the charge controller 11 may determine whether the reservation-based charging mode of the in-vehicle charger 10 is set immediately before the charge controller 11 is turned off (S21), and when the reservation-based charging mode is not set, the charge controller 11 may be turned off. When the charge controller 11 determines that the reservation-based charging mode is set, the charge controller 11 may set a new charger abnormality flag signal and may store the signal in a non-volatile storage of the charge controller 11 before the charge controller 11 is autonomously turned off (S22).

When a reservation-based charging mode of the in-vehicle charger 10 is unintentionally released or a main battery begins to be normally charged for a reason such as remote charging, the charger abnormality flag signal may be deleted from the non-volatile storage of the charge controller 11 and, thus, upon determining that the reservation-based charging mode is set, the charge controller 11 may set a new charger abnormality flag signal and may store the signal in the non-volatile storage.

The reservation-based charging mode may refer to a mode in which a main battery begins to be charged at a time point desired by a user according to setting information related to reservation-based charging of the charge controller 11 and charging of the main battery is terminated when a predetermined state of charge (SOC) is reached and, when the reservation-based charging mode is set, normally, the in-vehicle charger 10 may be on standby to start charging and starts battery charging when the reservation-based charging time is reached. In the instant case, a vehicle may turn off all controllers related to charging up to a charging start time and may enter a sleep mode.

In operation S17, when an abnormal operation of the outside-vehicle charger 20 is detected based on the charger abnormality flag signal, i.e., when an abnormal operation of the outside-vehicle charger 20 is determined based on the CP signal and the charger abnormality flag signal received from the outside-vehicle charger 20, the charge controller 11 may be determined to be woken up by the abnormal operation of the outside-vehicle charger 20, and whether a standby time T2 set to a predetermined value elapses may be determined (S23). Upon determining that the standby time T2 elapses, the charge controller 11 may be autonomously and immediately turned off.

That is, when the charge controller 11 is determined to be woken up due to an abnormal operation of the outside-vehicle charger 20, the charge controller 11 may be turned off after the predetermined standby time T2 elapses after the charge controller 11 is determined to be woken up due to an abnormal operation of the outside-vehicle charger 20.

Here, the standby time T2 may be set to a much shorter time value than the standby time T1 for standing by to receive the charging start signal.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling a vehicle reservation-based charging device, the method comprising:
    determining a reason for waking up a charge controller for controlling an in-vehicle charger for charging a first battery used as a power source of a vehicle when the charge controller is woken up in a reservation-based charging mode of the in-vehicle charger; and
    turning off the charge controller upon determining that the reason for waking up the charge controller is an abnormal operation of an outside-vehicle charger.

2. The method of claim 1, wherein the turning off the charge controller includes:
    determining when the outside-vehicle charger abnormally operates based on a charger abnormality flag signal stored in the charge controller when a battery relay for controlling power supply of a second battery to the charge controller is turned off and a reservation-based charging cancellation signal for canceling reservation-based charging of the in-vehicle charger is not generated; and
    determining that the charge controller is woken up due to the abnormal operation of the outside-vehicle charger upon determining that the outside-vehicle charger abnormally operates.

3. The method of claim 2, wherein the second battery is connected to the charge controller through the battery relay to supply power to the charge controller when the battery relay is turned on.

4. The method of claim 2, wherein the second battery is connected to the charge controller through a reservation-based charging cancellation signal generator for generating the reservation-based charging cancellation signal to supply power to the charge controller when the reservation-based charging cancellation signal is generated.

5. The method of claim 4, wherein a controller power supply device for supplying power of the second battery to the charge controller to wake up the charge controller when the reservation-based charging cancellation signal is generated is installed between the reservation-based charging cancellation signal generator and the charge controller.

6. The method of claim 2, wherein the turning off the charge controller further including:
    determining that the charge controller is woken up because a charging fee payment signal for use of the outside-vehicle charger is generated by a charger payment determination unit upon determining that the outside-vehicle charger is not operating abnormally.

7. The method of claim 6, wherein the second battery is connected to the charge controller through the charger payment determination unit to supply power to the charge controller when the charger payment determination unit generates the charging fee payment signal.

8. The method of claim 6, wherein, upon determining that the charging fee payment signal is generated and receiving a charging start signal by the charge controller, the first battery begins to be charged.

9. The method of claim 6, further including:
    upon determining that the charging fee payment signal is generated, when the outside-vehicle charger does not receive a charging start signal, turning off the charge controller; and
    when a reservation-based charging mode of the in-vehicle charger is set, storing a charger abnormality flag signal for detecting the abnormal operation of the outside-vehicle charger in a non-volatile storage of the charge controller prior to the turning off of the charge controller.

10. The method of claim 3, wherein the battery relay is turned on by a controller other than the charge controller.

11. The method of claim 1, wherein the in-vehicle charger receives power from the outside-vehicle charger to charge the first battery.

12. The method of claim 1, wherein the turning off the charge controller upon determining that the reason for waking up the charge controller is the abnormal operation of the outside-vehicle charger, further includes:
    turning off the charge controller in a predetermined time period after determining that the reason for waking up the charge controller is the abnormal operation of the outside-vehicle charger.

13. A vehicle reservation-based charging device comprising:
    an in-vehicle charger configured of charging a first battery used as a power source of a vehicle;
    a controller power supply device configured of supplying power to a charge controller connect to the controller power supply device for controlling the in-vehicle charger to wake up the charge controller when power is supplied from a second battery of the vehicle; and
    a power supply control unit installed between the second battery and the controller power supply device and configured to control electrical connection between the second battery and the controller power supply device,
    wherein the charge controller is configured to be turned off upon being woken up due to an abnormal operation of an outside-vehicle charger when the in-vehicle charger is in a reservation-based charging mode.

14. The vehicle reservation-based charging device of claim 13,
    wherein, when the second battery and the controller power supply device are not electrically connected by the power supply control unit, the charge controller determines when the outside-vehicle charger abnormally operates based on a charger abnormality flag signal stored in the charge controller, and, wherein, upon determining that the outside-vehicle charger abnormally operates, the charge controller determines that the charge controller is woken up due to an abnormal operation of the outside-vehicle charger.

15. The vehicle reservation-based charging device of claim 14, wherein the power supply control unit includes;
   a reservation-based charging cancellation signal generator configured to generate a reservation-based charging cancellation signal for canceling reservation-based charging of the in-vehicle charger during an operation thereof and to supply power of the second battery to the controller power supply device; and
   a battery relay installed between the second battery and the controller power supply device and configured to supply power of the second battery to the controller power supply device during an operation thereof.

16. The vehicle reservation-based charging device of claim 14, wherein, upon determining that the outside-vehicle charger does not abnormally operate, the charge controller determines that the charge controller is woken up because a charging fee payment signal for use of the outside-vehicle charger is generated by a charger payment determination unit.

17. The vehicle reservation-based charging device of claim 16, wherein the charge controller is turned off when the charger payment determination unit generates the charging fee payment signal and the outside-vehicle charger does not receive a charging start signal and stores a charger abnormality flag signal for detecting the abnormal operation of the outside-vehicle charger in a non-volatile storage of the charge controller before the charging controller is turned off when the reservation-based charging mode of the in-vehicle charger is set.

18. The vehicle reservation-based charging device of claim 13, wherein the outside-vehicle charger supplies power for charging the first battery to the in-vehicle charger.

19. The vehicle reservation-based charging device of claim 15, wherein the power supply control unit further including a reservation-based charging cancellation signal maintaining unit installed between the reservation-based charging cancellation signal generator and the charge controller and configured to maintain the reservation-based charging cancellation signal generated by the reservation-based charging cancellation signal generator for a predetermined time period and to transmit the reservation-based charging cancellation signal to the charge controller.

20. The vehicle reservation-based charging device of claim 13,
   wherein, upon determining that the outside-vehicle charger abnormally operates and upon determining that the charge controller is woken up due to the abnormal operation of the outside-vehicle charger, the charge controller is turned off after a predetermined time period after determining that the charge controller is woken up due to the abnormal operation of the outside-vehicle charger.

* * * * *